United States Patent
Potts et al.

(10) Patent No.: US 10,371,287 B2
(45) Date of Patent: Aug. 6, 2019

(54) ALIGNMENT ORIFICE SHIELD

(71) Applicant: Geomatrix, LLC, Old Saybrook, CT (US)

(72) Inventors: David A. Potts, Lyme, CT (US); Daniel Borkowski, Meriden, CT (US)

( * ) Notice: Subject to any disclaimer, the term of this patent is extended or adjusted under 35 U.S.C. 154(b) by 132 days.

(21) Appl. No.: 14/491,312

(22) Filed: Sep. 19, 2014

(65) Prior Publication Data

US 2016/0084406 A1    Mar. 24, 2016

(51) Int. Cl.

| | |
|---|---|
| F16L 55/07 | (2006.01) |
| F16L 1/06 | (2006.01) |
| E03F 1/00 | (2006.01) |
| F16L 1/10 | (2006.01) |
| F16L 1/028 | (2006.01) |
| F16L 3/12 | (2006.01) |

(52) U.S. Cl.
CPC .............. *F16L 1/10* (2013.01); *E03F 1/002* (2013.01); *F16L 1/028* (2013.01); *F16L 3/1207* (2013.01)

(58) Field of Classification Search
CPC ... F16L 1/00; F16L 1/024; F16L 1/028; F16L 1/06; F16L 1/10; F16L 1/11; F16L 3/1207; E03F 1/002; E03F 1/003; C02F 3/046; A01G 25/06; B23B 41/00; B23B 51/0426; B23B 51/044; B23B 2215/72; B26F 1/0015; B26F 1/003; B26F 1/02; B26F 1/04; B26F 1/16
USPC ..... 405/36, 43, 44, 45, 48, 80, 154.1, 184.4; 120/170.08; 239/596; 83/862
See application file for complete search history.

(56) References Cited

U.S. PATENT DOCUMENTS

| | | | |
|---|---|---|---|
| 1,343,548 A | 6/1920 | Branin | |
| 1,354,087 A | 9/1920 | Bueker | |
| 3,463,428 A | 8/1969 | Kindorf | |
| 3,771,751 A | 11/1973 | Derivaz | |
| 3,998,391 A * | 12/1976 | Lemelshtrich | A01G 25/023 239/542 |
| 4,074,402 A | 2/1978 | Taketani | |
| 4,389,138 A * | 6/1983 | Soderstrom | E02B 11/005 138/111 |
| 4,392,616 A * | 7/1983 | Olson | A01G 25/026 239/271 |
| 5,876,161 A * | 3/1999 | Ikola | B23B 41/04 408/110 |
| 6,663,317 B1 * | 12/2003 | Williams | E03F 3/046 404/3 |
| 7,270,532 B2 * | 9/2007 | Presby | B01D 29/23 264/156 |
| 7,387,468 B2 * | 6/2008 | Gavin | A01G 25/06 239/596 |
| 2008/0073259 A1 * | 3/2008 | Potts | C02F 1/685 210/170.08 |

* cited by examiner

*Primary Examiner* — Frederick L Lagman
*Assistant Examiner* — Stacy N Lawson
(74) *Attorney, Agent, or Firm* — Grasso PLLC

(57) ABSTRACT

Systems, methods, process, and article of manufacture regarding alignment orifice shields are provided. Shields can be configured to mate with leaching conduits in a certain configuration and can provide visual clues with regard to orientation as well as stability of installation for a pressurized or gravity-flow conduit. Methods of manufacture are also provided where manual or automated systems may be used for securing and adapting conduits to align with one or shields prior to or during installation of a leaching system.

24 Claims, 13 Drawing Sheets

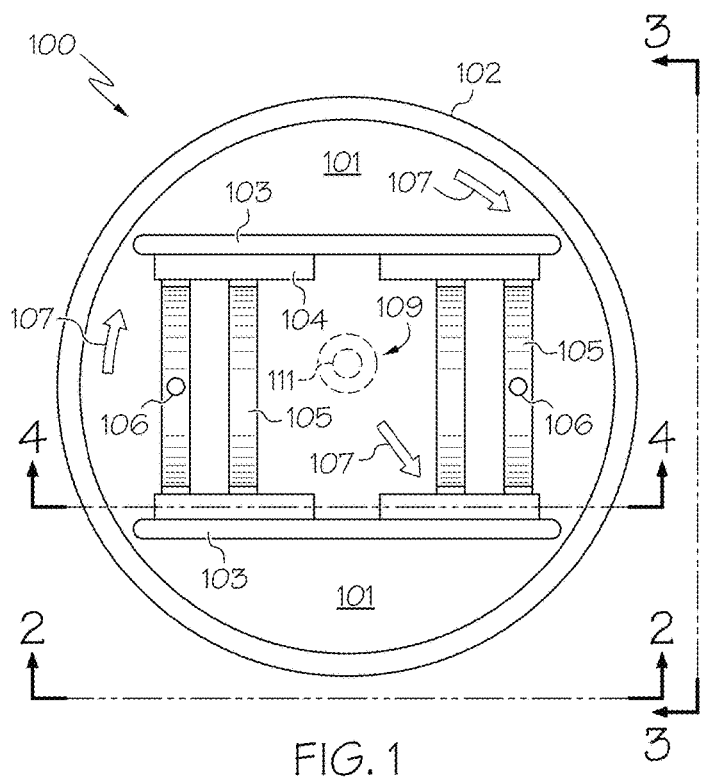
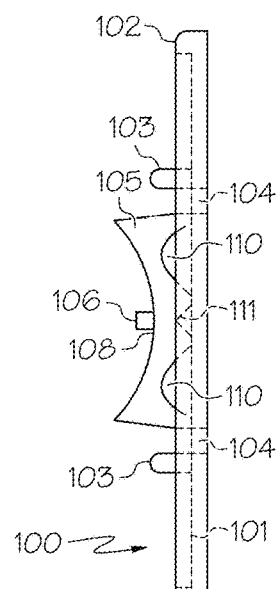
FIG. 1
FIG. 3
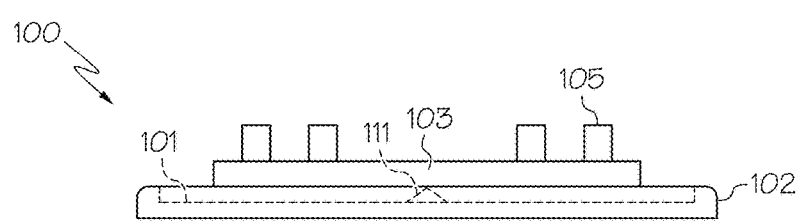
FIG. 2
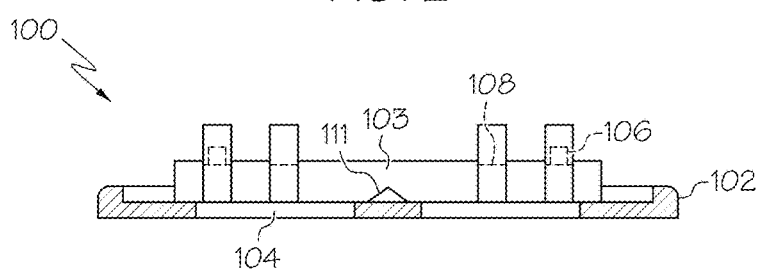
FIG. 4

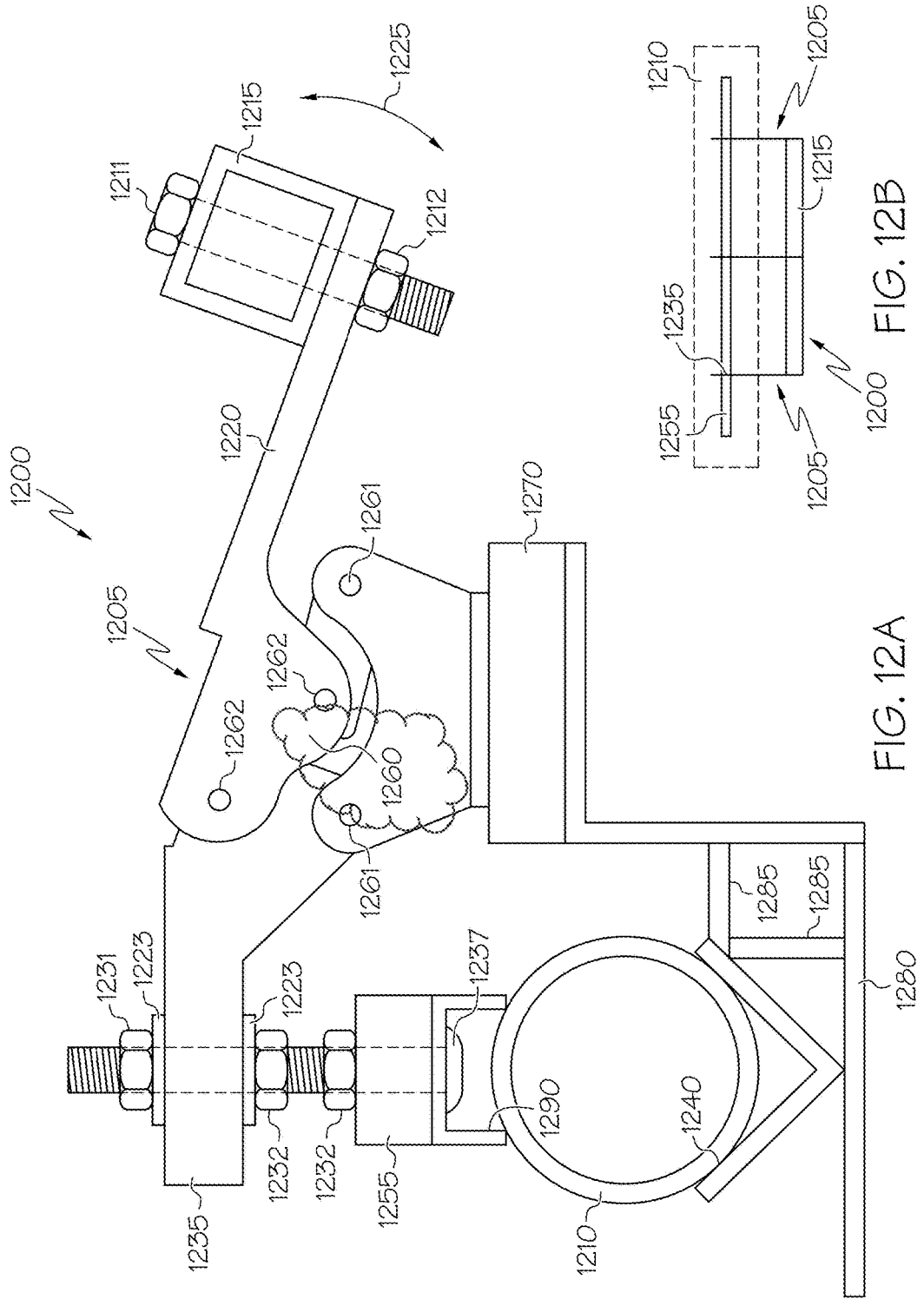

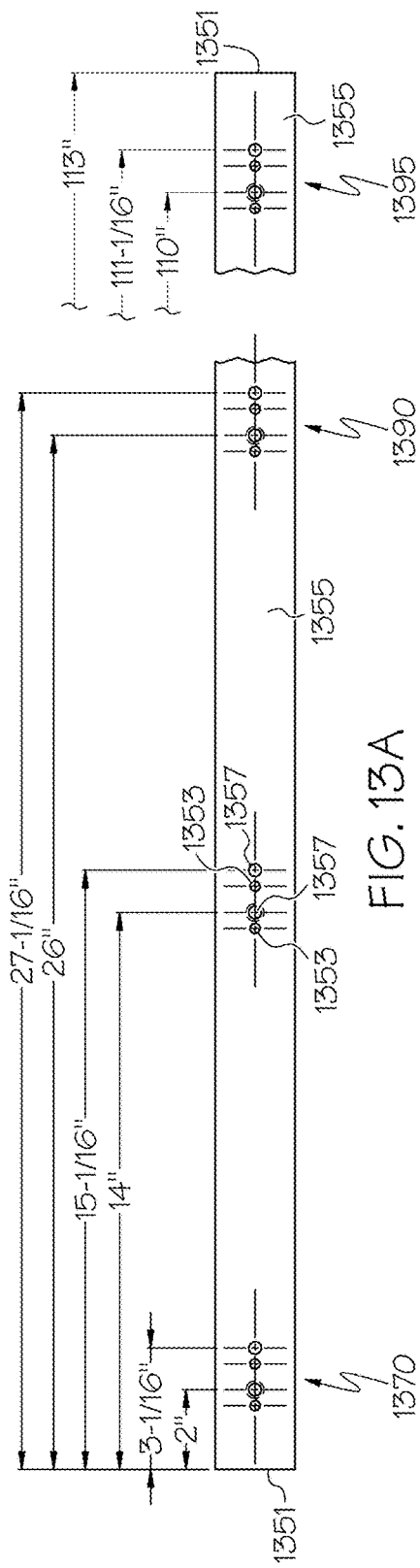
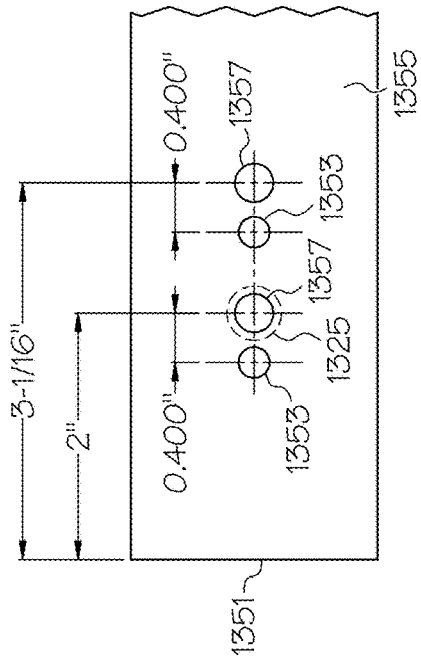
FIG. 13A
FIG. 13B

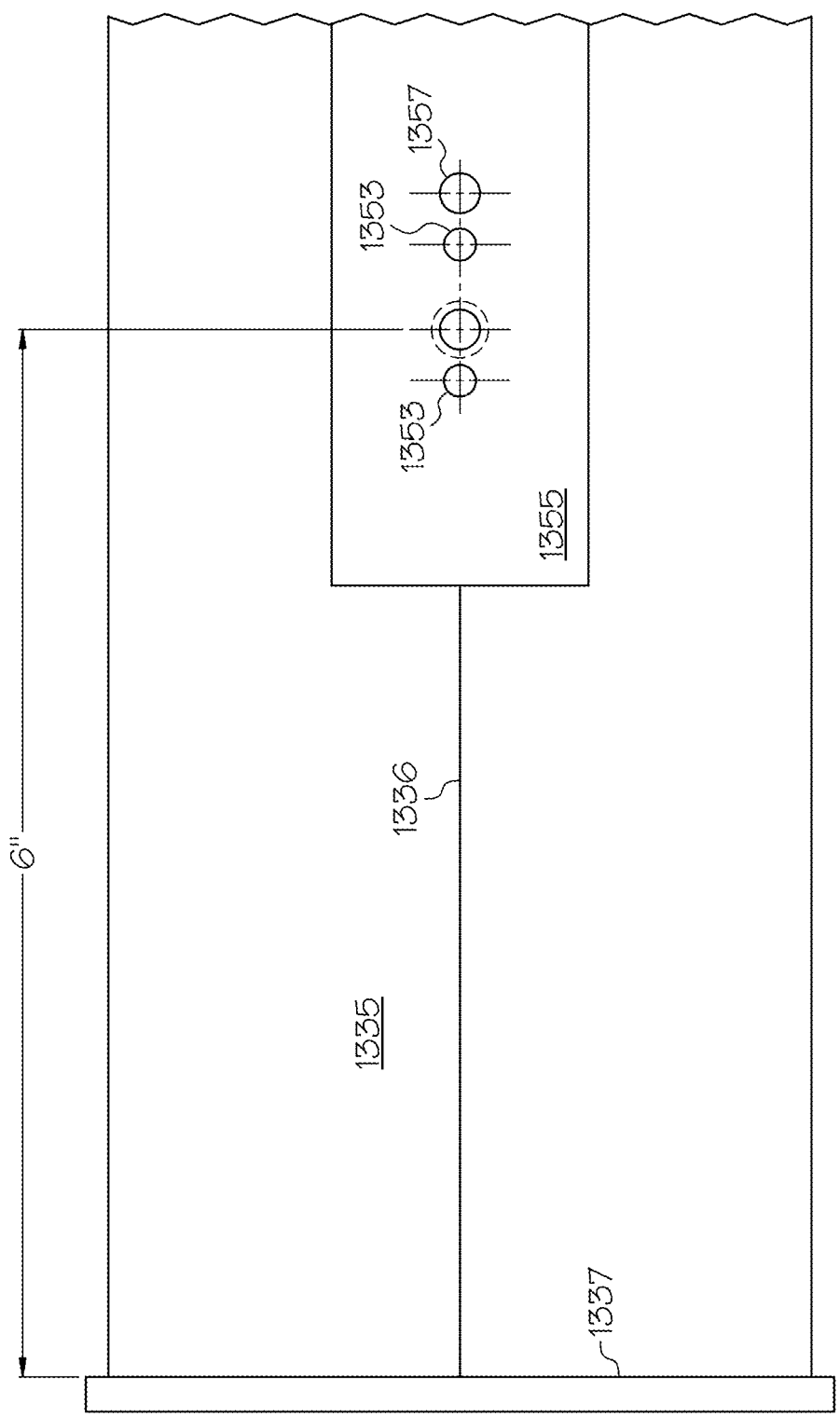

ALIGNMENT ORIFICE SHIELD

TECHNICAL FIELD

The present invention relates to pressurized and unpressurized wastewater leaching systems and more specifically to alignment or shielding, or both, of leaching conduits of wastewater leaching systems, including subsurface conduit systems.

BACKGROUND

Onsite disposal of wastewater is regularly carried out with a soil absorption system ("SAS"). These SASs may regularly employ a wastewater treatment tank, possibly one or more screens to further screen out solids or larger debris from the wastewater, and a leaching system where wastewater leaving the tank is fed to and subsequently leached into soil for absorption by the soil.

BRIEF SUMMARY

Embodiments provided herein are directed to processes, devices, and articles of manufacture related to conduits serving to deliver wastewater or other fluid via gravity and/or under pressure to various places in the system, or to discharge that wastewater at various places in the system, or both. Discharge may be for various purposes of infiltration, which includes irrigation and treatment, among others.

Embodiments may include alignment orifice shields ("AOS") secured to a conduit, such as a round, oblong, or flat pipe, where one or more AOSs can serve to: indicate the location of wastewater exit orifices of the conduit; provide stability, including rotational stability, to the conduit it is attached to as well as to other connected conduits or components of the system, indicate whether an installation has moved or remains as placed. This stability and reference may be useful during assembly, installation, and later use of the conduit or conduits. For example, in embodiments, the rotational stability can serve to maintain exit orifices of the conduit in a desired position relative to the orientation of the conduit and the leaching system of which the conduit may be a part. Thus, when the conduit is a circular pipe, the exit orifices may be maintained at its bottom curvature or other target orientation during installation and after the system is fully installed through the use of AOSs. In so doing the orientation of exit orifices of the pipe can be maintained in a preferred direction and the installation accuracy can be readily verified during the progression of installation steps both in the shop and in the field.

Still further, in embodiments it may also be preferential to maintain exit orifices of a conduit in different locations as well, for example, for a circular or non-circular conduit the exit orifices may be on non-adjacent sides so AOSs may serve to keep these non-adjacent sides on the lower half of the conduit in an installed position. Accordingly, in embodiments, an AOS may be secured to the conduit ahead of final installation and may be used to align exit orifices in a certain preferred predetermined manner and to maintain that orientation during and throughout installation. In addition, AOSs may also serve as a signal to indicate if unwanted rotation of the conduit has occurred. In other words, visual inspection of one or more AOSs when installed or during installation, including markings on the AOS, may provide indications to an installer or inspector that a desired orientation of the conduits and the associated orifices has been achieved or is maintained at some point in time after initial orientation, perhaps right before backfilling the leaching system of which the conduits are a part.

In embodiments AOSs may provide support to the conduit and serve to reduce point loading by distributing a load over a broader area. This support may, for example, serve to reduce point loading on surrounding material, such as a geomat or other Low Aspect Ratio leaching systems as described in U.S. Pat. No. 7,465,390 for example, which may be positioned above, below, or otherwise in fluid communication with the conduit with AOS.

The AOS may also, for example, serve to assist positioning of the conduit in another conduit, e.g., a pipe within a pipe. By using an AOS in this manner the inner conduit with AOS may be elevated above the bottom of an outer conduit and may also be secured or biased to a certain relative position to the outer conduit.

In embodiments, AOSs may provide fluid redirection functionality for wastewater or other fluid leaving exit orifices of a conduit associated with the AOS. This redirection functionality may serve to slow the momentum of wastewater or other fluid leaving the exit orifices of the conduit before or as the wastewater or other fluid enters the material surrounding the conduit. This may be especially useful for systems where water or other fluid is discharged under pressure and the AOS can serve to disperse the water or other fluid and slow its velocity. In embodiments, the AOS may reroute the wastewater as well and may even provide some buffering capacity to wastewater where wastewater accumulates in the AOS before passing to the surrounding material. Still other purposes for redirection or buffering may also be possible as an AOS is employed with various systems, here and elsewhere where these systems can include pressurized, gravity flow, and mixed hybrid systems, which employ gravity flow and pressure.

Adaptation and assembly of conduits may also be provided in embodiments. This can include using an adjustable manual or automated jig device to pre-drill orifices as well as alignment recesses or other alignment indicia in the conduit for use in mating with AOSs during subsequent manufacture or assembly. These alignment recesses may be, for example, positioned and sized to enable alignment with an AOS and alignment of the AOS relative to one or more exit orifices of the conduit. In other words, conduits may be pierced using various manual and automated methods to create discharge orifices and the conduits may be further modified with recesses or tabs or stops or other adaptations that can serve to orient and position an AOS relative to the conduit and relative to certain discharge orifices. These other indicia may be installed using a jig device as well, where the jig device provides for ready and accurate positioning and orientation of the tabs on or to a conduit.

Through the use of an adjustable jig device, a setting may be consistently repeated for a group of conduits to be used in the same leaching system. Moreover, the settings of the jig may be adjusted incrementally to provide desired adjustments in the positioning of leaching conduits in embodiments as well. These adjustments can include setting AOSs uniformly apart, at incrementally larger spacing, at exponentially larger spacing, and at different orientations relative to the pipe or other conduit. These jig devices may employ various mechanizing and manual systems including hydraulics, control electronics, motors, levers, shift loaders, power assist lifters, and other components.

In embodiments automation may be employed to increase the speed or accuracy of preparation of a pipe or other conduit, which may be receiving an AOS or a plurality of AOSs along its length. This automation can include assembly of the conduit and AOS in addition to preparation of either or both the conduit and the AOS. In addition to the use of a manual or automated jig device still further automation in embodiments can also serve to improve the accuracy of exit orifice dimensions as well as their positioning on the conduit.

Embodiments may be considered advantageous in that the relative position between the AOS and a conduit, such as a pipe, may be maintained constant through the use of the alignment jig device or other means. By maintaining designed orientations, unwanted clogging of conduit orifices by the shield itself during or after installation may be reduced.

In embodiments AOSs may have a circular or oval shape. This shape, without corners, may slide more easily into an outer pipe or other conduit as compared to shapes with corners. Thus, while AOSs may have corners in embodiments, such as squares or rectangles or diamonds, preferred embodiments may be round or oblong or oval, such that a leading edge of the AOS is more narrow than the trailing body when the AOS is inserted into an outer conduit, such as an 4" corrugated and perforated leaching pipe (e.g., PVC, HDPE, etc.).

Numerous embodiments are possible beyond those specifically described herein. The embodiments described herein are illustrative and should not be considered to be limiting. For example, fewer or more features or actions may accompany those specifically described herein and processes described herein may be undertaken in various orders unless a specific order is explicitly called for in the applicable claim or description.

BRIEF DESCRIPTION OF THE SEVERAL VIEWS OF THE DRAWINGS

FIG. 1 is top view of an AOS as may be employed in accord with embodiments.

FIG. 2 is a side view of the AOS of FIG. 1 along line 2-2 of FIG. 1 as may be employed in accord with embodiments.

FIG. 3 is a side view of the AOS of FIG. 1 along line 3-3 of FIG. 1 as may be employed in accord with embodiments.

FIG. 4 is a sectional view of the AOS of FIG. 1 along line 4-4 of FIG. 1 as may be employed in accord with embodiments.

FIG. 12A is a side view of a jig for preparing a wastewater conduit as may be employed in accord with embodiments.

FIG. 12B is a top view of the jig acting on the conduit as may be employed in accord with embodiments.

FIG. 13A is a top view of a drill bushing bar for a jig as may be employed in accord with embodiments.

FIG. 13B is an enlarged view of an end of the drill bushing bar of FIG. 13A as may be employed in accord with embodiments.

FIG. 13C is a top view of an end of the drill bushing bar of FIG. 13A positioned above a clamp seat of a jig as may be employed in accord with embodiments.

DETAILED DESCRIPTION

Figure 5:
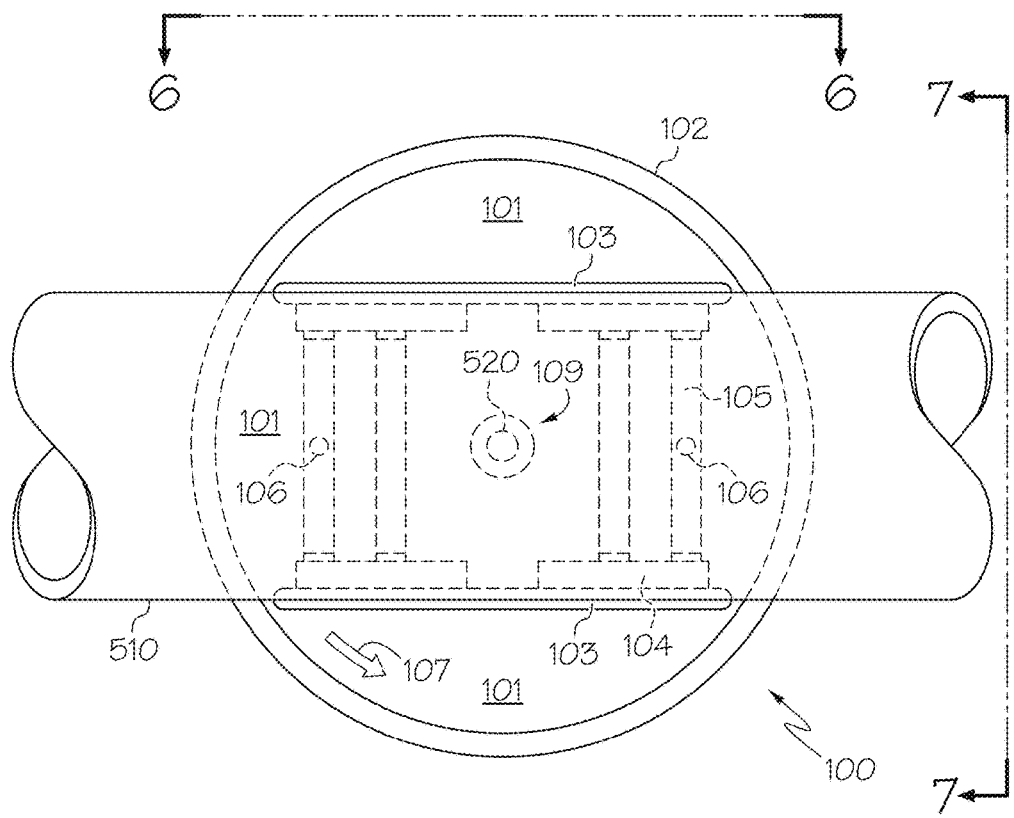
FIG. 5 is top view of the AOS of FIG. 1 beneath a conduit as may be employed in accord with embodiments.

Embodiments provided herein are directed to processes, devices, and articles of manufacture regarding leaching conduits of wastewater leaching systems. Discharge may be for various purposes of infiltration, which includes irrigation and treatment, among others. Embodiments may include alignment orifice shields ("AOS") secured to a conduit, such as a round, oblong, or flat pipe, where one or more AOSs can serve to: indicate the location of wastewater exit orifices of the conduit; provide stability, including rotational stability, to the conduit it is attached to as well as to other connected conduits or components of the system, indicate whether an installation has moved or remains as placed.

This stability and reference may be useful during assembly, installation, and later use of the conduit or conduits. For example, as noted above, in embodiments, the rotational stability can serve to maintain exit orifices of the conduit in a desired position relative to the orientation of the conduit and the leaching system of which the conduit may be a part.

As also noted above the embodiments can employ a device such as a manual or automated jig device with a clamp for holding a leaching conduit workpiece securely and in a desired orientation relative to sets of drill bushing guides or other mechanisms to modify the conduit such that the conduit may be coupled to another device in a certain orientation. In other words, embodiments are provided where a leaching conduit for use in a soil absorption system or other leaching system is held in place, acted upon as a workpiece such that the actions performed modify the conduit for receipt of an AOS, or secure to the conduit a means to mate with an AOS of some sort. In certain instances, the adaptation may assist in the alignment of that AOS with the conduit.

These AOSs may be secured to the conduit in numerous locations using various methodologies including, straps, ties, welding, etc. . . . and may serve to align the conduit in a desired fashion as the conduit is employed in a wastewater leaching system. This may include aligning the conduits in treatment media as well as in larger conduits, such as 4" perforated pipe. This may also include enabling the conduit to discharge water under pressure and under solely gravitational flows.

In embodiments the clamp of a jig may include a drill bushing bar that may be held in position relative to a clamped conduit workpiece and may serve as a guide for drilling discharge orifices in the conduit at selected locations. The drill bushing bar may also include alignment recess drill bushings that may serve to guide activities for creating alignment recesses at selected locations on the conduit. The drill busing bar may also be configured to make other modifications to the leaching conduit workpiece that can serve with the orientation of a AOS mounted to the conduit. For example, a plurality of alignment bushings may be positioned along the length of a conduit workpiece and may be used to rivet AOSs to the conduit at predetermined intervals and at a certain orientation relative to the conduit.

Still further, in embodiments, the spacing between the thru-hole bushings and the alignment bushings of a jig may be set to correspond with a certain conduit AOS and to preclude the use of other conduit AOSs not complying with the spacing. For example, if several different AOS sizes are available, the spacing between the bushings can be set such that only one of the available AOSs can be used along the conduit or at certain positions along the conduit if different size AOSs are intended to be used along the same conduit run. In other words, if several AOSs are required for a conduit installation, the distance between the drill bushings, and in turn the distance between the hole and recess they are used to create on the conduit, may serve to control whether certain AOSs available on a job site can be used. AOSs may be secured in a temporary and permanent fashion to conduits in embodiments.

When hydraulic drills and automation is employed in embodiments, the drill boring and alignment recesses may be created without the use of a bushing bar and may, be completed by clamping the workpiece conduit in place and acting on it with the mechanized drill and/or other devices used to create the alignment recesses or other alignment means and the discharge orifices on the leaching conduit.

In embodiments, an AOS may serve as a drip break that redirects wastewater leaving the leaching conduit of a soil absorption system. In embodiments, the AOS may also serve to reduce the velocity of wastewater leaving the conduit and in so doing reduce or eliminate the displacement of nearby treatment media by the momentum of the wastewater leaching from the leaching conduit. For example, through the use of these AOSs, undesirable movement of material surrounding the conduit discharge orifice may be reduced or eliminated. Moreover, by distributing wastewater leaving the conduit away from a single point impact in surrounding leaching material, the amount of transport erosion of that material may be reduced. Subsurface ponding near the exit orifice of the conduit may be reduced as well in embodiments. Thus, wastewater that would have flowed or streamed straight down from an exit orifice of the leaching conduit, for example, may be redirected and its velocity slowed as well. In so doing point erosion directly underneath the exit opening of the conduit may be reduced and water may be more broadly distributed.

Also, movement of the conduit associated with pressurized discharge of water from its orifices may be reduced. In some embodiments this broader distribution may also be carried out with some degree of randomness caused by the geometry of an AOS positioned near the conduit opening. For example, if an AOS contains a pointed interface with dripping wastewater that dripping interface may randomly direct the wastewater away from the conduit and into the surrounding materials in various random directions. Using the flat circular AOS as an example for illustrative purposes, the pointed interface may sometimes direct water in any of 360° of direction away from the pointed interface along the surface of the AOS.

In embodiments, an AOS and conduit combination may also be directly placed into soil and perhaps wrapped with fabric such that no additional stone, peas stone etc. is used in the SAS or nearby the AOS and conduit. Fabric can also be extended between different AOSs to allow capillary flow of water.

In further embodiments, systems using AOSs may comprise a filter fabric layer, a pipe with a plurality of AOSs, and filter fabric placed on top of each. And, in still further embodiments, the conduit and AOS combination may be slid into or above a leaching structure or leaching material where the structure or material is positioned or will be positioned in a leach field for receipt and discharge of wastewater. Here, as with other embodiments, the leaching material or leaching structure may be used in place or in combination with stone, pea stone, or other discharge media.

Wastewater should be considered to include water carrying waste generated in a commercial, industrial and residential setting. This waste may include organics and septic waste/contaminants as well as other waste that is transported or diluted in water for subsequent discharge and may be deemed nonhazardous in certain jurisdictions. The amount of waste/contaminates may decrease as the wastewater is treated and may reach zero contaminants or acceptable level of contaminants at later or final stages of treatment of the wastewater. Thus, wastewater in certain embodiments may not contain any contaminants at all, but may have had contaminants ahead of the final treatments of the wastewater. One such example is wastewater in a residential septic leaching field where discharged water has been treated in the soil by bacteria to the point where it contains a level of contaminants equal or less than background levels. This discharged water, resident in the leaching field but containing levels of contaminants equal to background levels may still be considered wastewater because of its origination, prior handling, or prior treatment. Wastewater may be made more benign from a health and environmental perspective. Wastewater can be treated upstream or downstream of the AOS. Also, leaching systems as used herein should be considered to include irrigation systems as well as waste treatment systems; all referred to as SAS.

FIG. 1 shows a circular alignment orifice shield ("AOS") 100 having an accumulation wall 102, a wastewater flow surface 101, divider walls 103, wastewater flow openings 104, saddles 105, alignment tabs (aligners or alignment means) 106, fluid dispersion zone 109, pointed interface 111, and wastewater flow arrows 107. In use, a pipe or other conduit may be secured to the saddles 105 where one or more of the alignment tabs 106 may align with recesses of the pipe to serve as an alignment means between the pipe and the shield. Exit orifices of the pipe, which is not shown, may dispense fluid from the pipe towards the shield under pressure and under gravitational flow. The AOS 100 in this and other embodiments may serve to deflect, redirect, and buffer this fluid. It may also serve as an indicator to confirm orifice alignment or other installation accuracy during or after placement of conduits employing the AOSs. For example, the divider walls 103 may be a different color to serve as visual indicators for indicating the direction of the AOS so that during installation, when several AOS are coupled to a conduit, their orientation can be confirmed by visually inspecting the orientation of each of the walls or other visual indicators of adjacent AOSs and confirming that they lay in a straight line or other intended orientation.

FIG. 2 shows the side view of the circular AOS 100 from line 2-2 of FIG. 1. As can be seen, the accumulation wall 102 in embodiments may have upright walls and a rounded top and may be sized to sit above a planar wastewater flow surface 101. In so doing, when the AOS is installed in a level configuration, the accumulation wall 102 can serve to divert water first through the openings 104 before spilling over the wall to the surrounding material. As can also be seen, the divider walls 103 may also have upright walls with a rounded top surface. This divider wall may serve to route and direct water or other fluid about the AOS and can also serve as a visual indicator or position, such as a survey point for verifying installation accuracy, or orientation, via informal visual inspection, or both. The pointed interface 111 may be conical and may be centrally located in the AOS, as well as positioned directly below any exit orifice of the leaching conduit to which the AOS 100 is secured.

The shared common height of the AOS saddles 105 is also evident in FIG. 2. In embodiments, these saddle heights and other size configurations, including its recess curvature and the shape of the seat itself, may also be varied to accommodate design parameters of the leaching conduit and installation parameters of the soil absorption system in which the conduit is to be used. For example, if a corrugated pipe is being used as a leaching conduit, adjacent saddles and saddles of the same pair may be of different heights such that they may be secured to the corrugated conduit and receive the different diameters of that conduit. Still further, the saddle configuration can also be crenulated, convex, symmetrical in pairs, unsymmetrical with regard to other saddles, and other configurations as well. The saddles may also have openings 110 in their sides to allow for fluid flow as shown in FIG. 3.

FIG. 3 shows the side view of the circular AOS 100 from line 3-3 of FIG. 1. As can be seen, this view of the AOS 100 shows the valley 108 of the concave surface of the AOS saddle 105 and the positioning of the alignment tab 106 in the valley 108 of the concave surface of the AOS saddles. Also visible in FIG. 3 is the wastewater flow surface 101, the wastewater divider walls 103, the pointed interface 111, the openings 104 in the flow surface 101 and the openings 110 in the AOS saddles 105. The openings 110 may allow wastewater reaching the surface 101 to move through the AOS saddles 105. In embodiments, these openings 104 may be at the surface 101 and may be above the surface 101 but below the height of the wall 102 in order to control the amount to wastewater first flowing out though the openings 104, and then later accumulating and overflowing the walls 102. In embodiments, these openings in the AOS saddles may also be omitted. Likewise, other changes to this AOS and other AOSs may be made in embodiments. In preferred embodiments, at least one of the top or bottom surfaces of an AOS will be flat or substantially flat.

FIG. 4 shows a sectional view along line 4-4 of the circular AOS 100 of FIG. 1. As can be seen, this view of the AOS 100 shows the wastewater flow openings 104, the divider wall 103, alignment tabs 106, pointed interface 111, and the valley 108 of the concave surface of the AOS saddles. The height of the valley 108 can be seen in this view to be lower than the top of the divider 103, and the height of the tab 106 can also be seen relative to the valley 108 and the wall 103. The accumulation wall 102 is also labeled in FIG. 4.

In embodiments, when this or other AOSs are used, they may be configured such that a predetermined orientation of the AOS relative to the conduit is provided. For example, an AOS may be configured such that only one or a selected few orientations relative to the leaching conduit may be possible. In preferred orientations holes in a pipe preferably align and share the same reference plane. In certain embodiments both the aligners and the discharge orifices will align along shared reference places, perhaps offset by 15°, 30°, 45°, 60°, 75° or 90°. For example, the holes may be pointing to the right or left at an angle of 90° relative to the positioning of aligners pointing in a vertical direction.

Figure 6:
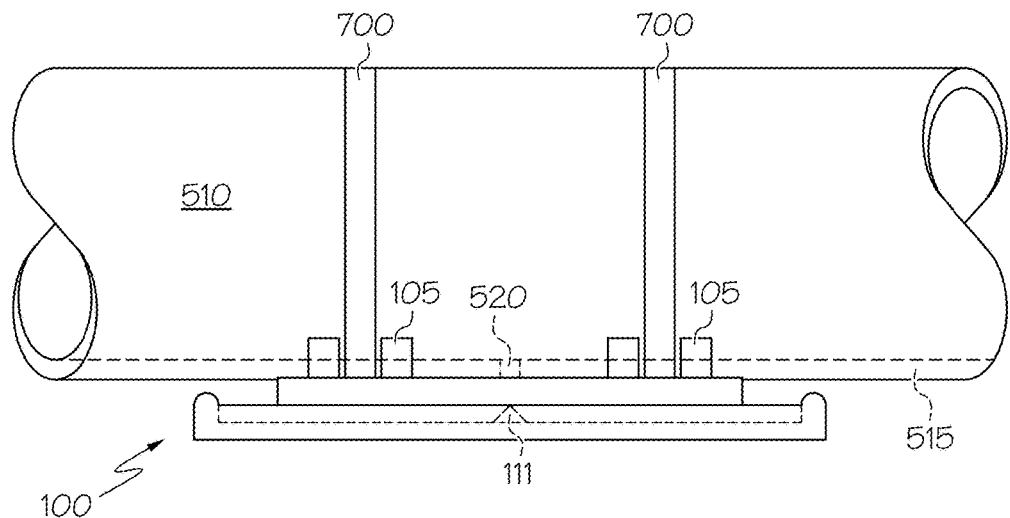
FIG. 6 is a side view of the AOS and conduit of FIG. 5 along line 6-6 of FIG. 5 as may be employed in accord with embodiments.
Figure 7:
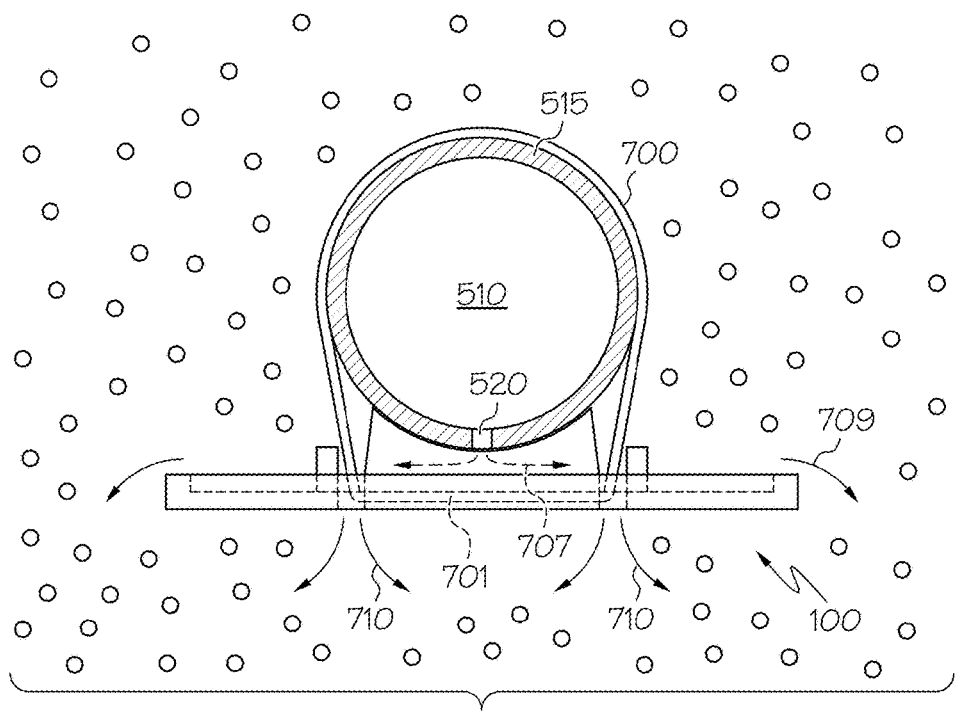
FIG. 7 is an end view of the AOS and conduit of FIG. 5 along line 7-7 of FIG. 5 as may be employed in accord with embodiments.

FIG. 5 shows a top view of the circular AOS 100 of FIG. 1 with a pipe conduit 510 resting in the AOS saddles 105 of the AOS 100. The conduit 510 includes a leaching discharge orifice 520 that has been aligned atop the fluid dispersion zone 109 of the circular AOS 100. As can be seen, the conduit is about the same width as the distance between the divider walls 103. In embodiments, as wastewater exits the conduit discharge orifice 520, it may flow down through the wastewater flow openings 104, as well as around the divider walls 103 as shown by arrow 107. Securement straps 700, which are shown in FIGS. 6 and 7, are not shown in the view of FIG. 5 to more clearly show how alignment and seating between the conduit pipe 510 and the AOS seat may be carried out in embodiments. The pointed interface 111 is not shown in this Figure but would be resident in the zone 109 and below the orifice 520. The alignment tabs 106, the flow openings 104, the accumulation wall 102, and the flow surface 101 are also labeled in FIG. 5.

FIG. 6 shows the side view of the pipe conduit 510 and the AOS 100 from line 6-6 of FIG. 5. As can be seen, the pipe conduit 510 is coupled to the AOS with straps 700 and the discharge orifice 520 is positioned between the AOS saddles 105. Thickness of the conduit wall is labeled at 515 and the pointed interface 111 is also labeled and visible in this Figure. Other securement methodologies may also be employed for securing the conduits to the AOSs. These can include glue, thermal welding, combinations of these with and without straps, and other methodologies as well.

FIG. 7 shows a sectional side view of the pipe conduit 510 and the AOS 100 along line 7-7 of FIG. 5. This view of the AOS and pipe conduit 510 shows the flow of wastewater out the discharge orifice 520 and down to the drip break zone 109, which is labeled and more clearly seen in FIG. 5, on the flow surface of the AOS. The flow arrows 707, 709, and 710 also show how wastewater may flow over the accumulation wall, as well as through the flow openings, down into the material surrounding and below the leaching conduit. This material can include pea stone, gravel aggregate, soil, synthetic fill, sand, and other material as well. This other leaching and drainage material can include Enkadrain drainage system product no. 9120 from Colbond Inc., P.O. Box 1057, Enka, N.C. 28728 as well as grid products such as Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026. U.S. Pat. Nos. 7,465,390, and 7,374,670, each naming David Potts as inventor, provide still further examples of how materials may be employed in soil absorption system embodiments and may be used in conjunction with the conduit and AOS or other embodiments described herein.

The pointed interface 111 is not shown in this Figure but would be resident below the orifice 520. Embodiments may or may not include this interface as well as other features shown in this and other embodiments. Strap 700 and its lower section 701 are visible in FIG. 7.

Figure 8:
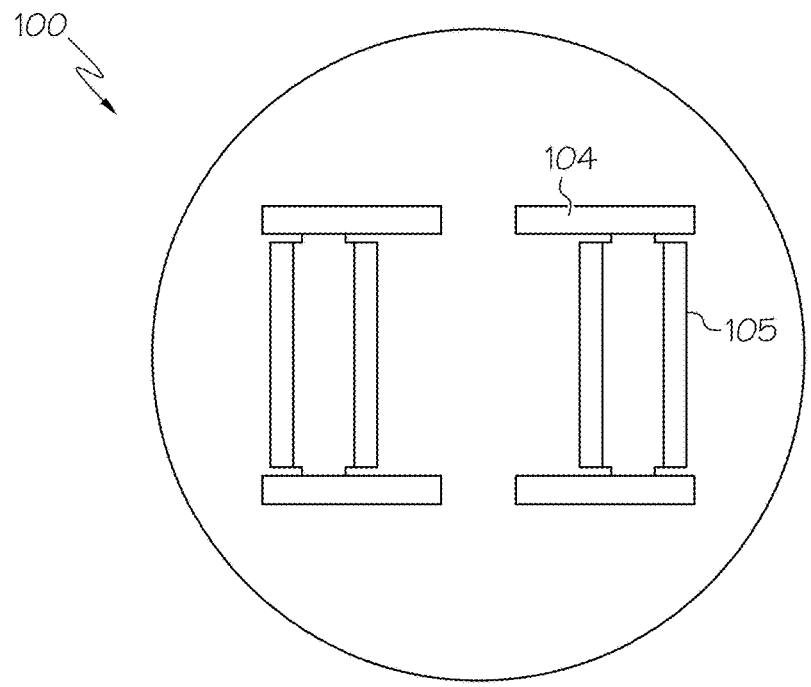
FIG. 8 is a bottom view of the AOS of FIG. 1 as may be employed in accord with embodiments.
Figure 9:
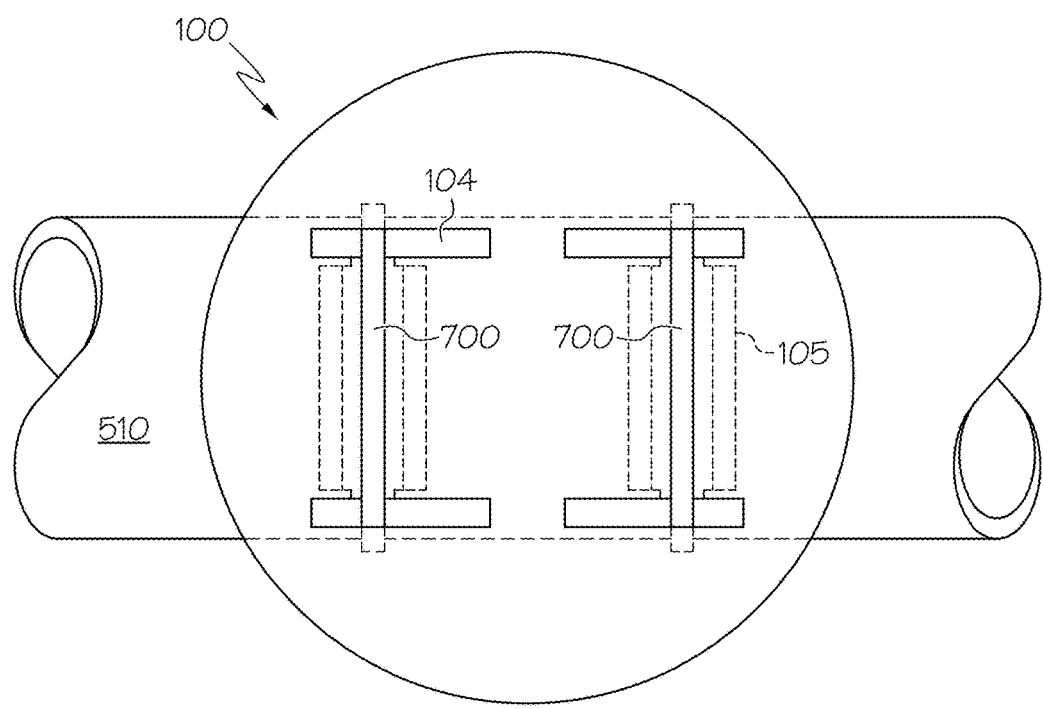
FIG. 9 is a bottom view of the AOS and conduit of FIG. 5 as may be employed in accord with embodiments.

FIGS. 8 and 9 show the bottom of AOS 100 without a pipe conduit and FIG. 9 shows the AOS 100 with a pipe conduit 510 strapped to the AOS 100 with straps 700, as may be employed in embodiments. As can be seen, the pipe conduit 510 may be wider than the spacing between the openings 104 and the width of the saddles 105.

Figure 10:
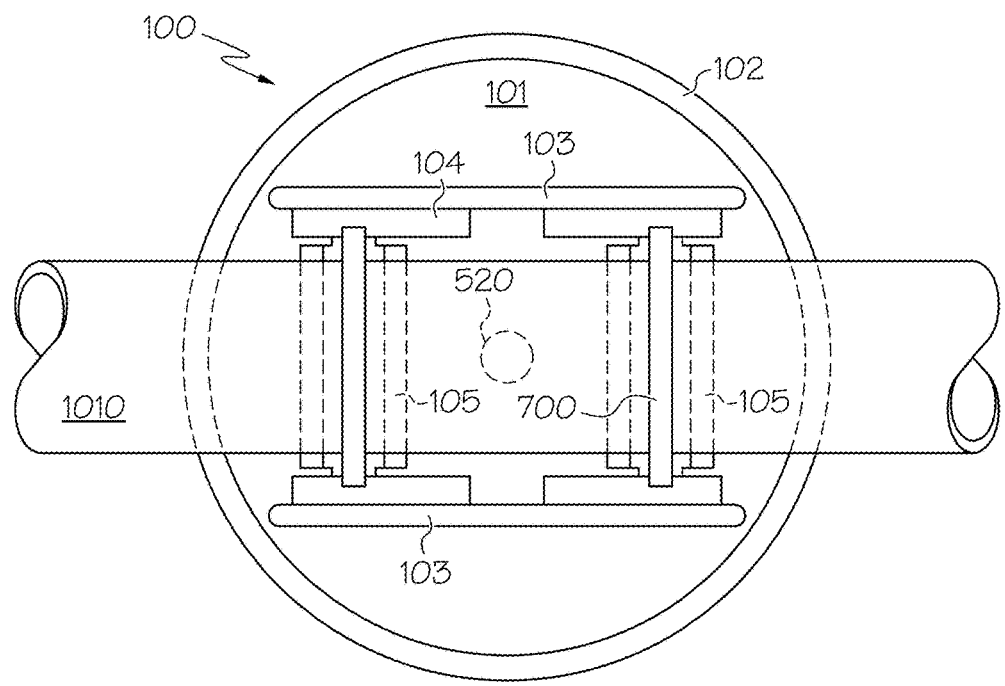
FIG. 10 is a bottom view of the AOS of FIG. 1 with another conduit as may be employed in accord with embodiments.

FIG. 10 shows a top view of the AOS 100 with a smaller conduit 1010 strapped to the AOS saddles 105 of the AOS 100 with straps 700. The wall 102, surface 101, divider 103, orifice 520, and openings 104 can also all be seen in this Figure. As is evident, the smaller diameter of the conduit 1010 is such that the conduit does not extend past the saddles 105 in this Figure.

Figure 11:
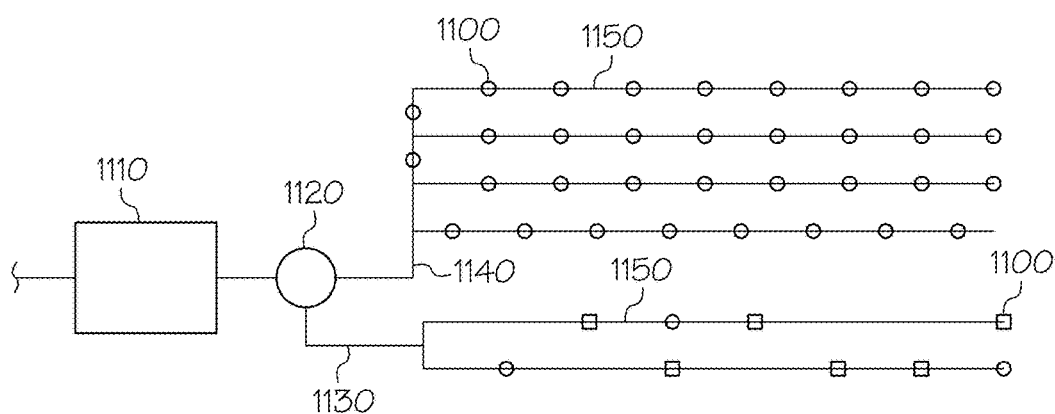
FIG. 11 is a plan view of a wastewater system employing AOSs as may be employed in accord with embodiments.

FIG. 11 shows a plan view of a subsurface soil absorption system as may be employed in accord with embodiments. Visible in FIG. 11 are the conduits 1150 having various AOSs 1100 spaced uniformly and non-uniformly along their length. Also visible in FIG. 11 are the settlement treatment tank 1110, the distribution box ("D-Box") 1120 (or pump 1120 in a pressurized system), and the main trunk lines 1130 and 1140 of the soil absorption system. In embodiments a treatment tank may include a compartment where treatment of a fluid occurs and a settlement tank may include a reservoir where settlement of materials from a fluid occurs. These treatment tanks/devices may be configured in various shapes and with various flow mechanisms to promote or retard flow into and out them during passage of fluid into and out of the tanks. Treatment tanks include but are not limited to septic tanks. Similarly, a septic tank may also be considered a settlement tank, but settlement tanks are not so limited.

In embodiments, the AOSs 1100 may be affixed to the conduits 1150 before the conduits are connected together and before the conduits are placed in their preferred position in the leaching system. The AOSs 1100 may serve to hold orifices of the conduits in a downward facing direction during the installation and afterwards as well. Moreover, a visual inspection of the AOSs, including features of the AOSs and colored indicators, may also provide an indication that the conduits are properly orientated at an initial placement or have not moved meaningfully at some time in the future. As noted above, these indications may be confirmed with and without formal survey equipment and techniques and through informal visual inspection as well.

In embodiments, the AOSs 1100 may also be affixed to the conduits 1150 after the conduits are connected together and after the conduits are placed in their preferred position in the leaching system. Plus a mix of affixing some AOSs before installation and some after conduit installation may also be used.

As can also be seen in FIG. 11, various kinds of AOSs may be employed and their spacing along the conduits may be both uniform and varied. Thus, in some embodiments, each of the orifices in a leaching conduit are all preferably aligned with an AOS while in other conduits every orifice may not all be aligned with an orifice and AOS. And, the conduits may be split into sets where one set employs a first conduit/AOS configuration and another set employs a different conduit/AOS configuration.

FIG. 11 shows how trunk line 1140 feeds a first set of conduits and AOSs, while trunk line 1130 feeds a second set of conduits and AOSs. Still further, the conduits 1150 may also be coupled to or positioned above or below or within geomat or other prefabricated drainage structure in this and other embodiments. Still further, the conduit 1150 may rest upon pea stone, gravel aggregate, soil, synthetic fill, sand, and other drainage and leaching material as well. This other drainage and leaching material can include Enkadrain drainage system product no. 9120 from Colbond Inc., P.O. Box 1057, Enka, N.C. 28728 as well as grid products such as Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026. U.S. Pat. Nos. 7,465,390, and 7,374,670, each naming David Potts as inventor, provide still further examples of how materials may be employed in soil absorption systems in association with distribution conduits.

Figure 14:
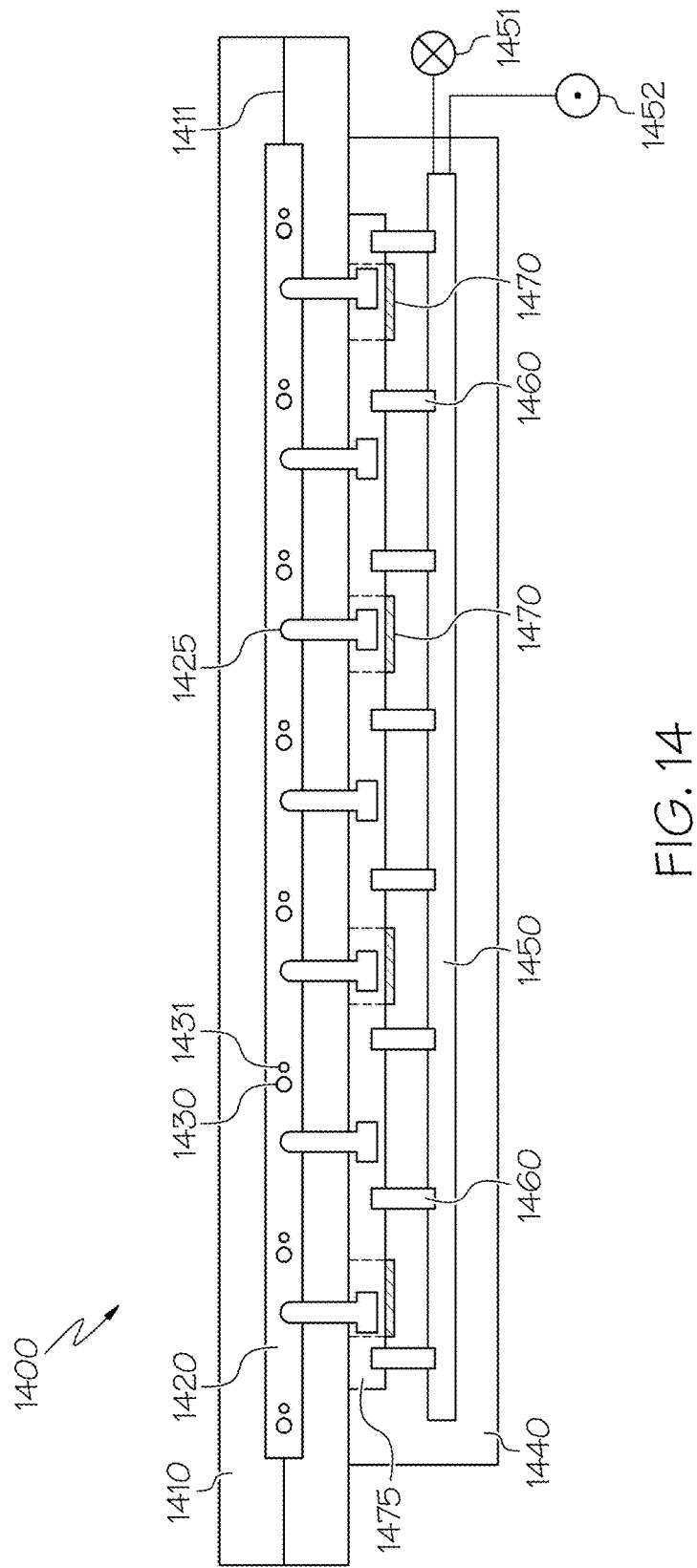
FIG. 14 shows a top down view of a jig including several clamps, a moveable clamp rail, and a stationary workpiece receiver as may be employed in accord with embodiments.

FIG. 14 shows a jig 1400 as may be employed in embodiments. This jig may be used to adapt a conduit workpiece for receipt of AOSs. The jig 1400 in embodiments may include a stationary receiver 1410 for receipt of a conduit workpiece and a moveable clamp rail with a bushing bar 1420 to act upon the conduit and serve to hold the conduit against the stationary receiver 1410. The jig 1400 may rest on support table mount 1440. This receiver 1410 may be a channel with a center line 1411. The clamp rail and bushing bar 1420 may be actuated by moving the actuator bar 1450 up and down in the directions of vector arrows 1451 and 1452. The actuator bar 1450 may be connected, with connectors 1460 to a clamp gang 1475, which is in turn connected to a plurality of clamps 1425 located along its length. Thus, a conduit workpiece may be secured and held in the receiver 1410 by lifting on the bar 1450 such that the clamps 1425 are locked into a clamped position. The conduit may then be adapted for receipt of the AOSs as well as may be configured with associated leaching orifices. Once worked on, the conduit may be removed after the actuator bar 1450 is moved and the clamps accordingly opened. The thru-hole bushings 1430 may be used to install orifices in the conduit and the alignment tab bushings 1431 may be used to adapt the conduit for tailored association with an AOS. Either or both of the thru-hole bushings and the alignment tab bushings may be adjustable such that the depths of the holes and receivers to be drilled is controllable. In preferred embodiments, this may include drilling through the bushings 1430 and completely through the wall of conduit in the clamp and drilling only partly through the wall of the conduit when using the alignment tab bushing 1431.

In embodiments one or several alignment pins or other means may be used for each orifice and other means for adapting the conduit via the bushings may also be employed. These may include using rivets, punches, soldering guns, and other devices for creating the leaching orifices and for adapting the conduit to align with the AOS. Connector 1460 and support 1470 are also visible in FIG. 14.

In these and other embodiments multiple orifices may be aligned for each AOS and multiple alignment recesses and alignment tabs may also be employed to align the AOSs to the conduit. Still further, the alignment tabs may have various shapes and positions to help further with alignment and orientation or for other reasons as well. And, automation may be used to carry out the entire process or large portions of it. In embodiments, this automation can include the handling of the workpieces ahead of and downstream of action in a jig device as well as actions taken while in the jig device. The automation may also include use of clamping and drilling without the bushing the bar described herein as an automated drill may provide the functionality of the bushing bar through system controls and software.

Still further, the jig may also be used to secure tabs or other alignment means to the conduit in addition to or rather than creating alignment recesses in a workpiece conduit. This securement may be accomplished by placing tabs into the drilling bores for alignment and positioning purposes and then securing the tabs to the conduit with glue, soldering, heat welding, and other attachment methodologies and systems.

FIG. 12A shows a side-view of a jig 1200 as may be employed in accord with embodiments. Visible in FIG. 12 is one of several toggle clamps 1205 that may be spaced apart from each other in a uniform or non-uniform fashion along the length of the jig 1200. In embodiments, toggle clamps 1205, which can be seen in FIG. 12A, include pivots 1261 and 1262 arranged such that actuator bar 1215 movement results in movement of the u-channel 1290 relative to workpiece 1210 as the actuator bar 1215 is moved downwards or lifted upwards. The toggle clamps 1205 may be adjustable, such that their spacing apart from each other may be varied. Also, labeled in FIG. 12 are bolt head 1211, bolt nut 1212, actuator bar 1215, toggle clamp handle 1220, toggle clamp pivots 1262, toggle clamp mount 1270, washers 1223, clamping arm alignment bolt 1237, nuts 1231 and 1232, drill bushing bar 1255, u-channel moveable clamping face 1290, workpiece pipe conduit 1210, support members 1285, clamping receiver 1240, and flat jig stand 1280. 1235 is a clamping arm, 1261 are base pivots, and arrow 1225 shows direction of movement of the actuator bar 1215 when clamping and unclamping the jig.

FIG. 12B is a top view of the jig acting on the conduit as may be employed in accord with embodiments. As shown in FIGS. 12A and 12B, in embodiments, the jig 1200 may comprise a plurality of toggle clamps 1205 or other clamping mechanisms that can be used to secure and hold in alignment a workpiece to be used as or employed with a leaching conduit. When held in position, the workpiece may be acted upon to create discharge orifices along its length as well as recesses to accept alignment tabs of the AOSs 100 or other devices used that may be secured to the conduit. In embodiments, the jig 1200 may include three toggle clamps uniformly or non-uniformly spaced apart from each other and connected to each other by the actuator bar 1215 and the drill bushing bar 1255. In embodiments, the toggle clamps may be adjustable along actuator bar 1215, such that their spacing apart from each other may be varied. As the actuator bar is lifted, as shown by movement arrow 1225, the toggle clamp clamping arm 1235 and the drill bushing bar 1255 below it will move downwards and towards a workpiece that may be placed in the clamping receiver 1240. Adjustment of the u-channel clamping face 1290 may be made through rotation of the alignment bolt 1237 and the nuts 1231, 1232, and washers 1223. This alignment may be carried out such that the workpiece may be accessible when the clamp is in an open position and may be secured with a force suitable to retard rotation and other movement as the workpiece is drilled and otherwise worked upon. By holding a circular pipe conduit in this fashion, discharge orifices may be similarly placed and aligned along the length of the conduit at locations corresponding to the thru-hole drill bushings in the drill bushing bar. In addition, corresponding alignment tab recesses may also be drilled into the pipe conduit to improve the accuracy and ease in which the AOSs 100 or other configured drip break and alignment stand can be secured.

In embodiments, the u-channel 1290 may be a 1×0.5×0.125 inches c-channel and the bushing bar may be a 1×0.5 inches solid bar. The actuator bar may be a box 1×0.125 inches and the various pieces below the mount may be 0.125 inch steel angle iron. The receiver may also be an angle iron 1.125×1.25×0.125 inches. Also, the bushings may be 0.4 inches between their centers with the alignment bushing being threaded and the thru-bushing not being threaded. The thru-bushing may also have a larger diameter than the alignment bushing, for example, ¼ v 5/16 inches.

By providing accurate and repeatable positioning of the discharge orifice and the alignment tab recess along the length of the pipe conduit or other conduit for use in a wastewater leaching system, the conduits used in that system may be more readily placed during installation with its orifices pointed in a desired direction. In this embodiment, downwardly. Moreover, by securing the AOS 100 to the conduit, wastewater discharged by the conduit through the orifice may be retarded from direct flow to treatment material surrounding an installed conduit. Wastewater discharged by the orifice may pond on one or more surfaces of the AOS 100 and may be redirected by the AOS as shown in, for example FIG. 7.

In FIG. 12A, the clamping receiver 1240 is shown as a "v" shape to accommodate the circular pipe conduit. Because of the circular shape, no flat surface is presented for perpendicular drilling through the surface of the pipe and along a radius of a cross-section of the pipe. By using the v-shaped clamp seat, perpendicular alignment of the drill bushings in drill bushing bar may be possible. Other shapes of the clamping seat may also be used. These can include: u-bottomed seats to accommodate flat pipes to be stood on end and drilled along a short curved wall; saw toothed seats to accommodate oddly shaped conduits; and other configurations as well.

In embodiments, an AOS can be heat fused to a pipe or other conduit and portions or the entirety of the manufacture and assembly process can be mechanized with magazines and hopper for moving and handling the workpieces. This can include during the welding process.

FIGS. 13A-13C show various perspectives of the bushing bar 1355. This bar is moved up and down by the jig and serves to align the drill bushings over the workpiece conduit in order to drill the alignment recess in the conduit and to drill the discharge orifice as well. The bushing bar serves to maintain spacing and alignment for purposes of orienting the drill bushings in alignment relative to the pairs themselves as well as to other pairs along the length of the bushing bar. The bushing bar 1355 may be used for other purposes as well, including for securing alignment tabs to the conduit in embodiments using such tabs or other aligners.

Figure 15:
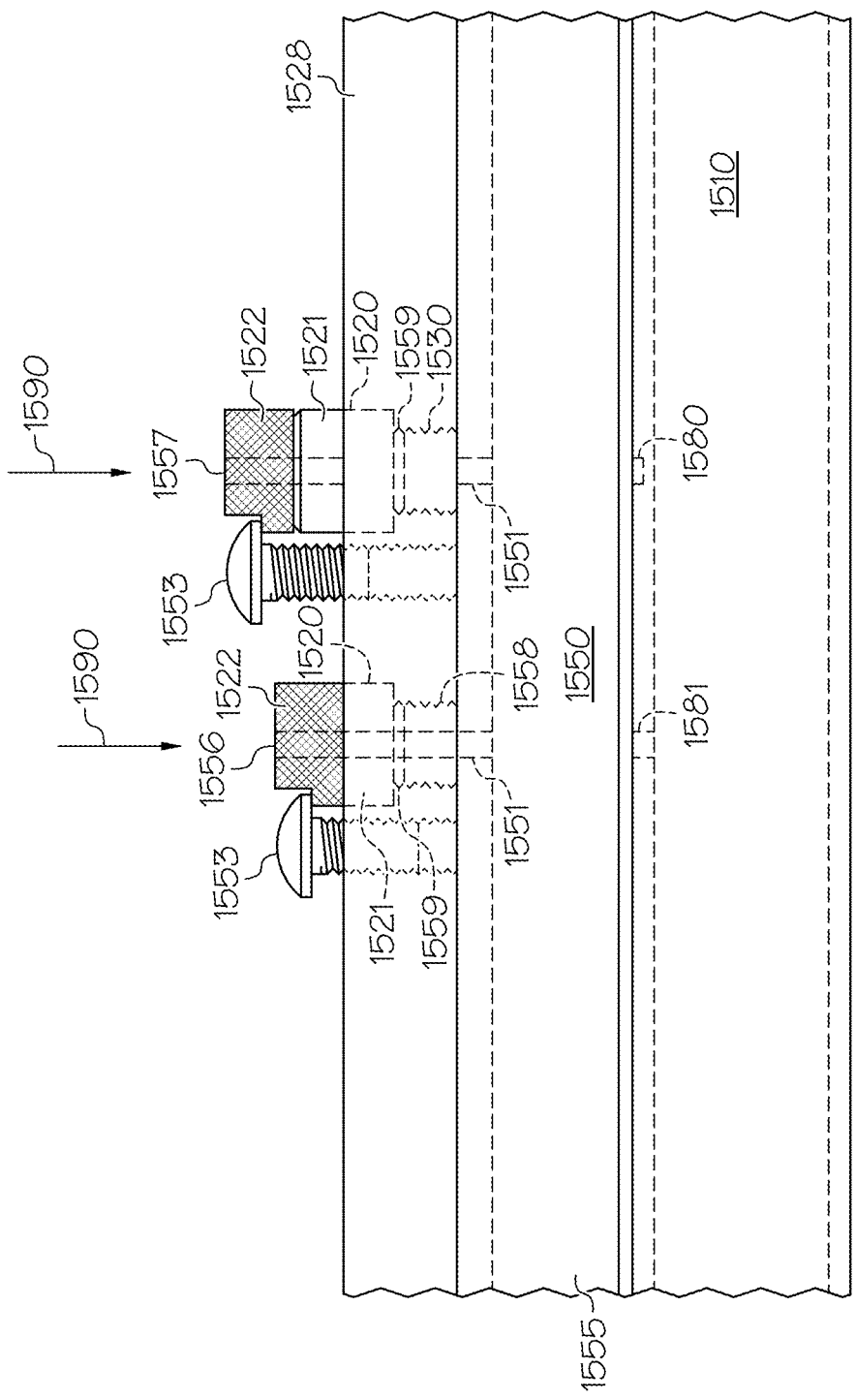
FIG. 15 is a side view of the drill bushing bar and moveable clamp rail in an unclamped position over a leaching conduit as may be employed in accord with embodiments.

FIGS. 13A and 13B show a top view of the bushing bar as may be employed in embodiments. FIG. 13B shows an enlarged end 1351 of the bushing bar 1355. Exemplary drill bushings themselves and their associated set screws are not in these figures but are shown in FIG. 15. As can be seen in FIGS. 13A and 13B, multiple sets of drill bushing bores 1357 paired with associated alignment set screw threaded bores 1353, may be positioned along the length of the drill bushing bar 1355. These sets may be uniformly spaced apart from each other and may have a different spacing between them as well. The alignment circle 1325 is also labeled in FIG. 13B.

FIG. 13A shows the first set of drill bushing bores and set screw threaded bores 1370 having their bore centers positioned 2 inches and 3 1/16 inches from an end 1351 of the bar 1355. Other sets are also shown positioned along the length of the bar 1355, including set 1390 and 1395. As can be seen, more than four sets may be used. The number of sets used may depend upon the length of the conduit, the amount of wastewater expected to flow through the conduit, the size of the discharge orifices to be drilled using the jig and other factors and considerations as well.

FIG. 13C shows a top down end view of the bushing bar 1355 over a clamp seat 1335. Also visible is the stop 1337 at the end of the clamp seat 1335. This stop 1337 may be used to position conduit workpieces below the bushing bar and ahead of clamping operations in order to uniformly set the end spacing of the orifices and recesses to be drilled in the conduit. Also visible in FIG. 13C is the bottom 1336 of the v-shaped clamp seat 1335.

As can be seen, this bottom aligns with the center line of the bushing bar 1355 as well as the bores running through the bushing bar. By aligning the bottom and the centers of the bores as such the position of the orifice may be predicted and the bore being created through the workpiece is more likely to be parallel the cross-sectional radius of a circular pipe conduit or other shaped conduit that is centered over the bottom center line 1336. Alignment bushing bore 1353 and orifice bushing bore 1357 are also shown in this Figure.

FIG. 15 shows a side enlarged view of a bushing bar 1528 and an upper clamping face 1555 positioned over a conduit workpiece 1510 as may be employed in embodiments. As can be seen in FIG. 15, the drill bushings 1520 may include drill bushing heads 1522 as well as drill bushing bodies 1521 and may comprise a center drill bore guide 1556, 1557 there through. Also shown are discharge orifice 1581 through the conduit 1510 wall and an alignment recess 1580 for receiving an alignment partially penetrating the conduit 1510 wall. The drill bushings are shown with set screws 1553 that can serve to hold the bushings in place. Bushing depth shims 1559 are also shown. These depth shims may be adjustable in the bar in order to control the height of the drill bushings and the associated reach of a drill bit being guided into the drill bushing. In other words, as the drill bushing is moved up or down the distance, a drill bit can extend beyond the bushing bar and the face of the upper clamp changes. By consistently setting the drill bushing heads across the bushing bar a consistent depth for each alignment recess drilled into the conduit can be set. Also shown in FIG. 15 are shim threads 1558, 1530, bore channel 1551, u-channel 1550, and drill direction arrows 1590.

Figure 16A:
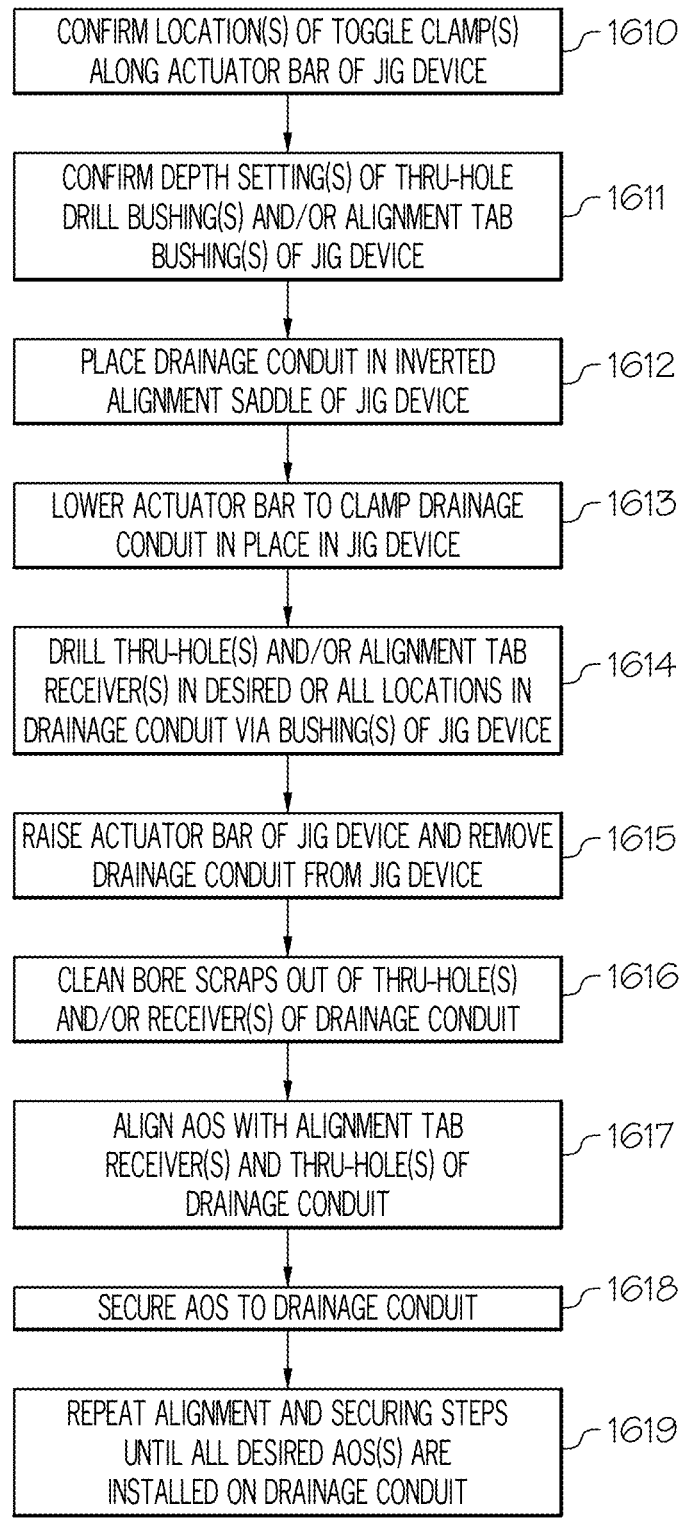
FIG. 16A is a process as may be employed in accord with embodiments.

FIG. 16A shows a method as may be employed in embodiments. Steps may be added, omitted, or rearranged as desired. In steps 1610 and 1611, the device may be prepared by confirming location(s) of toggle clamp(s) along the actuator bar (1610) and confirming depth setting(s) of thru-hole drill bushing(s) and/or alignment tab bushing(s) of the device (1611). Where the toggle clamp location(s) and/or depth setting(s) are not variable, steps 1610 and/or 1611 may be omitted. In step 1612, a leaching conduit to be worked on may be placed in the inverted alignment saddle of the device. In step 1613, the actuator bar of the device may be lowered to clamp the leaching conduit in place in the device. In step 1614, thru-hole(s) (leaching discharge orifice(s)) and/or alignment tab receiver(s) may be drilled in all desired locations of the leaching conduit via busing(s) of the device. In step 1615, the device actuator bar may be raised, and the leaching conduit may be removed from the device. In step 1616, bore scraps may be cleaned out of the thru-hole(s) and/or receiver(s) of the leaching conduit. In step 1617, an AOS may be aligned with a set of alignment tab receiver(s) and a thru-hole, where the alignment tab receiver(s) of the leaching conduit receive the alignment tab(s) of the AOS and the thru-hole of the leaching conduit may be aligned with the drip break zone and/or opening of the AOS. In step 1618, the AOS may be secured to the leaching conduit, such as with straps. In step 1619, alignment and securing steps may be repeated until all desired AOS are installed on the leaching conduit in the desired positions. Depth of drilling may also adjustable through the use of adjustable stop collars, drill press stop, and the like.

Figure 16B:
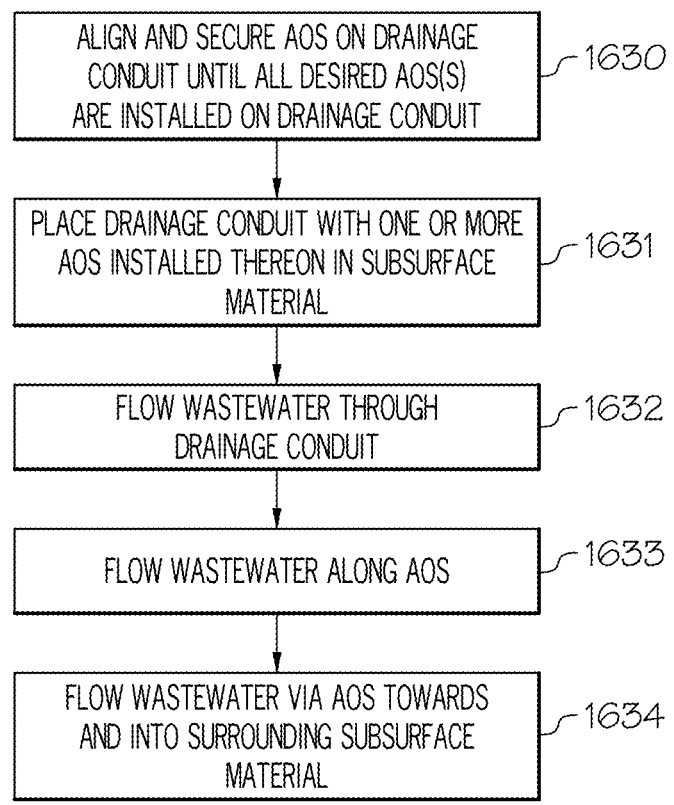
FIG. 16B is a process as may be employed in accord with embodiments.

FIG. 16B shows a method as may be employed in embodiments. As mentioned above, steps may be added, omitted, or rearranged as desired. In step 1630, one or more AOS is aligned and secured on a leaching conduit, and the process is repeated, if desired, until all desired AOS are installed on the leaching conduit. In step 1631, the leaching conduit with one or more AOS installed thereon may be placed in subsurface material, which may include, for example, treatment media and soil. In step 1632, wastewater may be flowed through the leaching conduit. In step 1633, wastewater may be flowed along one or more AOSs. In step 1624, wastewater is flowed via one or more AOSs and into the surrounding subsurface material.

Figure 17:
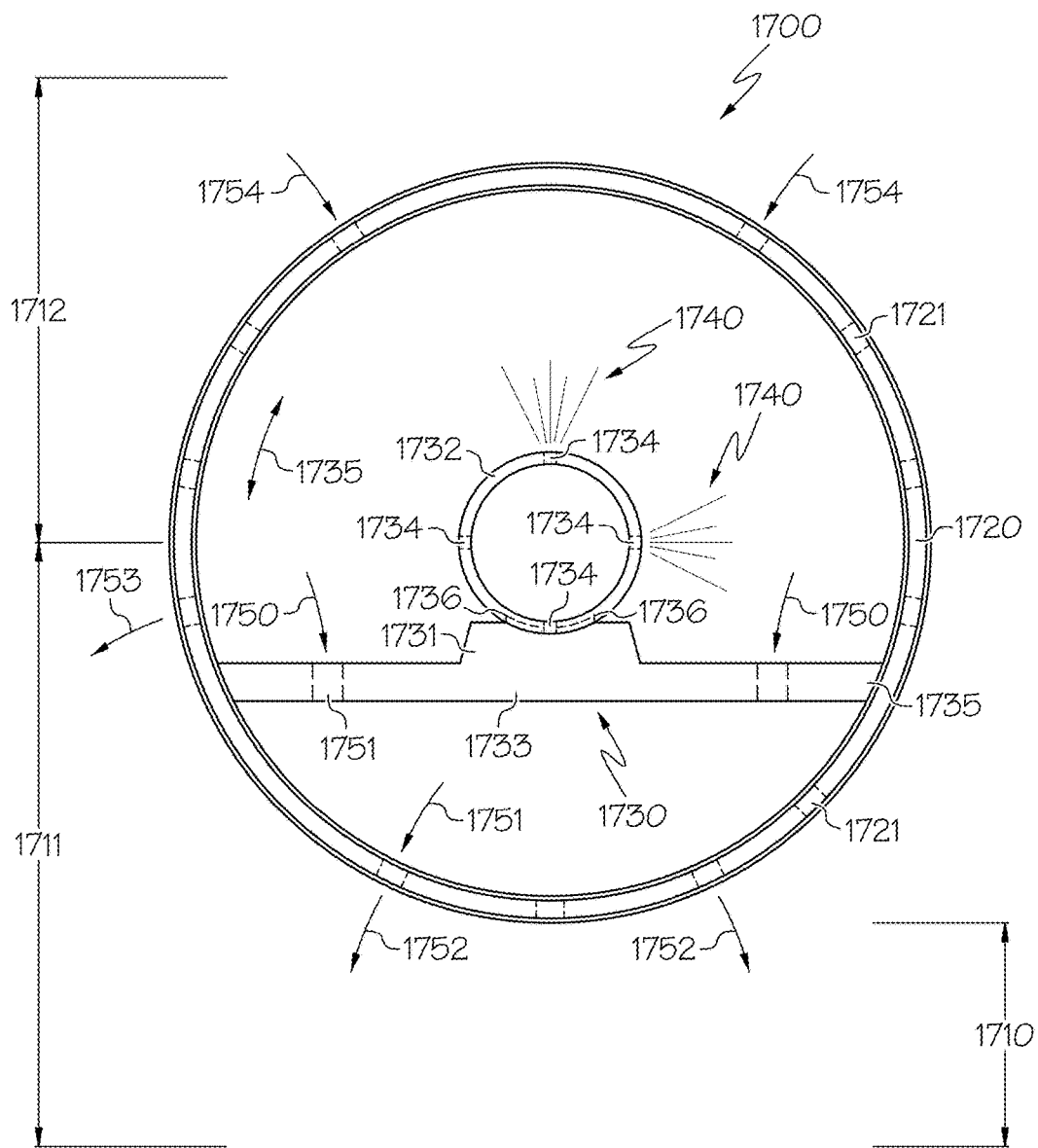
FIG. 17 is a side view of an AOS and conduit inside of a larger conduit as may be employed in embodiments.

FIG. 17 shows an alignment and orifice shield system 1700 as may be employed in embodiments. Shown in FIG. 17 are AOS 1730 within perforated and corrugated conduit 1720. The conduit 1720 has orifices 1721. These orifices may allow gas to flow in and out of the conduit 1720 as shown by arrows 1754 and 1752. Likewise, fluid, such as water, may also flow in and out of these orifices as shown by arrows 1754 and 1752. The system 1700 may be positioned at an invert elevation of 1712 and may have a stone bed 1710 or any of the other materials mentioned above, below it. Distance 1711 may be approximately 24" while distance 1712 may be 12" and 1710 may be 10" in embodiments. Other distances and positioning may also be employed in embodiments.

FIG. 17 also shows passages 1751 in the base 1733 of the AOS. The AOS 1730 also has a seat 1731 and alignment tabs 1736 for mating with aligning with conduit 1732. This conduit 1732 has orifices 1734 and may discharge water there through, as shown by 1740. The size of the base of the AOS may prevent the AOS from reaching the bottom of the conduit 1720. Arrow 1735 shows that the AOS may have some rotational movement in embodiments while in other embodiments there may be no rotational movement between the AOS and the conduit 1720. Arrows 1753 show how fluid may flow through the walls of the conduit 1720 from holes above the AOS. Arrows 1750 show how fluid may flow through a planar surface of the AOS.

In embodiments the corrugated conduit 1720 may be PVC, HDPE, metal, including steel, and other materials as well, and may have perforation holes at 75° and 105° and these holes may be ½" to ⅝" in diameter. The AOS 1730 may rest above these holes or just below them so as not to obstruct flow in and out of the holes of the conduit 1720. In embodiments the conduit 1732 may discharge fluid solely onto an AOS while in others the discharge may be onto an AOS and directly to the conduit 1720 as well. The orientation of the conduit 1732 relative to the conduit 1720 may be set at various orientations including have the bottom plane of the AOS set at horizontal and at other angles from horizontal, including 15°, 30°, 45°, and 90°. In some further embodiments the AOS may not touch the sides of the conduit 1720, but, may instead contain legs or other support that support the AOS from below where the legs of other support rest on the conduit 1720 and protrude from the bottom of the AOS.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operation, elements, components, and/or groups thereof.

Aspects of the presented embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions and in various orders and with fewer or more actions and descriptors.

The corresponding structures, material, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A wastewater leaching system comprising:
   a wastewater leaching conduit having an outer surface, a plurality of discharge orifices located on the outer surface, and one or more rotational alignment receptacles located on the outer surface; and
   an alignment orifice shield comprising a first wastewater leaching conduit seat, a wastewater shield, and one or more rotational alignment protrusions,
      wherein the first wastewater leaching conduit seat is adapted with an externally exposed receiving area to mate with the outer surface of the wastewater leaching conduit when the conduit is positioned in the externally exposed receiving area of the first wastewater leaching conduit seat,
      wherein the wastewater shield is connected to the first wastewater leaching conduit seat, the wastewater shield having an externally exposed wastewater receiving surface, the externally exposed wastewater receiving surface facing the first wastewater leaching conduit seat,
      wherein a gap exists between the externally exposed receiving area of the first wastewater leaching conduit seat and the externally exposed wastewater receiving surface,
      wherein the gap is configured to allow wastewater leaving one or more of the plurality of discharge orifices of the wastewater leaching conduit when the conduit is positioned in the externally exposed receiving area of the first wastewater leaching conduit seat to pass beyond the conduit seat through the gap and reach the externally exposed wastewater receiving surface of the wastewater shield,
      wherein the externally exposed wastewater receiving surface of the wastewater shield is configured to be positioned apart from the outer surface of the wastewater leaching conduit when the conduit is positioned in the externally exposed receiving area of the first wastewater leaching conduit seat,
      wherein the externally exposed wastewater receiving surface of the wastewater shield is planar or is substantially planar,
      wherein one or more of the rotational alignment protrusions extend from one or more portions of the alignment orifice shield before the conduit is positioned in the receiving area of the first wastewater leaching conduit seat and thereby before mating the alignment orifice shield with the outer surface of the wastewater leaching conduit when the conduit is positioned in the receiving area of the first wastewater leaching conduit seat,
      wherein one or more of the rotational alignment protrusions is configured to mate with a corresponding rotational alignment receptacle of the one or more rotational alignment receptacles located on the outer surface of the wastewater leaching conduit when the conduit is positioned in the receiving area of the first wastewater leaching conduit seat, and
      wherein one or more of the one or more rotational alignment receptacles located on the outer surface of the wastewater leaching conduit does not penetrate completely through an entire wall of the wastewater leaching conduit.

2. The system of claim 1 wherein one or more of the rotational alignment protrusions is a pin extending up from the alignment orifice shield, the pin sized and positioned to mate with at least one rotational alignment receptacle of the one or more rotational alignment receptacles of the wastewater leaching conduit.

3. The system of claim 1 wherein the wastewater shield is configured and positioned to deflect pressurized wastewater ejected from one or more discharge orifices of the plurality of discharge orifices of the wastewater leaching conduit when the conduit is secured to the first wastewater leaching conduit seat and receiving the one or more rotational alignment protrusions.

4. The system of claim 1 wherein the first wastewater leaching conduit seat is concave and is configured to receive the outer surface of the wastewater leaching conduit positioned in the externally exposed receiving area of the first wastewater leaching conduit seat and wherein the outer surface of the wastewater leaching conduit has a circular circumference.

5. The system of claim 1 further comprising a second wastewater leaching conduit seat adapted with an externally exposed receiving area to accept the outer surface of the wastewater leaching conduit when the conduit is positioned in the externally exposed receiving area of the second wastewater leaching conduit seat, the second wastewater leaching conduit seat connected to the wastewater shield.

6. The system of claim 5 wherein the first wastewater leaching conduit seat or the second wastewater leaching conduit seat or both are in the shape of a truncated triangle with a concave radius at the top of the triangle.

7. The system of claim 1 wherein the wastewater shield comprises a planar circular disc.

8. The system of claim 1 wherein the externally exposed wastewater receiving surface is planar.

9. A method of manufacturing a wastewater leaching pipe and alignment orifice shield system, the method comprising:
   placing a wastewater pipe in an alignment seat of a manufacturing jig device,
      the manufacturing jig device configured to provide positioning and alignment for creating one or more thru-holes in the wastewater pipe seated in the alignment seat of the jig device, the manufacturing jig device configured to provide positioning, alignment, and depth for creating one or more rotational alignment receptacles in an outer surface of the wastewater pipe seated in the alignment seat of the jig device;

creating one or more thru-holes in the wastewater pipe;

creating one or more rotational alignment receptacles in an outer surface of the wastewater pipe, the one or more alignment receptacles not penetrating completely through an entire wall of the wastewater pipe; and securing one or more alignment orifice shields to the wastewater pipe after the placing step and after the creating steps, wherein the one or more alignment orifice shields each comprises a first wastewater pipe seat, a wastewater shield, and one or more rotational alignment protrusions, wherein the first wastewater pipe seat is adapted with an externally exposed receiving area to mate with the outer surface of the wastewater pipe when the wastewater pipe is positioned in the externally exposed receiving area of the first wastewater pipe seat, wherein the wastewater shield is connected to the first wastewater pipe seat, the wastewater shield having an externally exposed wastewater receiving surface, the externally exposed wastewater receiving surface facing the first wastewater pipe seat, wherein a gap exists between the externally exposed receiving area of the first wastewater pipe seat and the externally exposed wastewater receiving surface of the wastewater shield, wherein the gap is configured to allow wastewater leaving one or more of the thru-holes of the wastewater pipe when the wastewater pipe is positioned in the externally exposed receiving area of the first wastewater pipe seat to pass beyond the first wastewater pipe seat through the gap and reach the externally exposed wastewater receiving surface of the wastewater shield, wherein the externally exposed wastewater receiving surface of the wastewater shield is configured to be positioned apart from the outer surface of the wastewater pipe when the wastewater pipe is positioned in the externally exposed receiving area of the first wastewater pipe seat, wherein the externally exposed wastewater receiving surface of the wastewater shield is planar or is substantially planar, wherein one or more of the rotational alignment protrusions extend from one or more portions of the one or more alignment orifice shields before the pipe is positioned in the receiving area of the first wastewater pipe seat and thereby before mating the alignment orifice shield with the outer surface of the wastewater pipe when the wastewater pipe is positioned in the receiving area of the first wastewater pipe seat, and wherein one or more of the rotational alignment protrusions is configured to mate with a corresponding rotational alignment receptacle of the one or more rotational alignment receptacles located on the outer surface of the wastewater pipe when the pipe is positioned in the receiving area of the first wastewater pipe seat.

10. The method of claim 9 wherein at least one of the placing, creating or securing steps is performed with mechanical automation.

11. The method of claim 9 wherein the securing one or more alignment orifice shields includes placing a strap around the wastewater pipe to connect the wastewater pipe to one of the alignment orifice shields and wherein the securing one or more of the alignment orifice shields includes mating the one or more rotational alignment protrusions of the alignment orifice shield with at least one of the one or more alignment receptacles of the wastewater pipe.

12. The method of claim 9 wherein at least one of the placing, creating or securing steps is performed manually.

13. The method of claim 9 wherein the manufacturing jig device comprises:

a bushing bar, the bushing bar moveable from an open position to a locked position, the locked position configured to hold the wastewater pipe in the alignment seat.

14. The method of claim 13 wherein the bushing bar comprises one or more drill bushing heads, the drill bushing heads configured for adjustably setting drill depth.

15. The method of claim 13 where the bushing bar is coupled to a lever, the lever serving to move the bushing bar from the open position to the locked position.

16. The method of claim 9 wherein the manufacturing jig device includes a base with first and second pivot points, a toggle clamp handle with at least two toggle clamp pivot points, and a clamping arm connected to the first pivot point of the base and at least one of the toggle clamp pivot points of the toggle clamp handle.

17. A wastewater leaching system comprising:

a wastewater leaching conduit having a plurality of wastewater discharge orifices, the discharge orifices positioned along the wastewater leaching conduit on one or more outside externally-facing surfaces of the wastewater leaching conduit, and the wastewater discharge orifices sized and positioned to permit wastewater running through the wastewater leaching conduit to exit the conduit through more than one of the wastewater discharge orifices; and a plurality of alignment orifice shields (AOSs) secured to the wastewater leaching conduit, each of the AOSs having a wastewater leaching conduit seat for receiving the wastewater leaching conduit and each of the AOSs positioned to receive and redirect wastewater discharged out of one or more of the wastewater discharge orifices of the wastewater leaching conduit, wherein wastewater discharged out of one or more of the wastewater discharge orifices of the wastewater leaching conduit initially contacts an AOS from the plurality of AOSs only after the wastewater has already passed through and out of a wastewater discharge orifice of the plurality of wastewater discharge orifices of the wastewater leaching conduit, wherein, before the AOSs and the wastewater leaching conduit are mated, each of the AOSs is further configured with an aligner sized and located to mate with a corresponding aligner of the wastewater leaching conduit, the AOS and the wastewater leaching conduit aligners also configured, such that when the AOS and wastewater leaching conduit are mated, to orient and position the AOS relative to the wastewater leaching conduit and relative to one or more of the wastewater discharge orifices of the wastewater leaching conduit, and wherein the corresponding aligner of the wastewater leaching conduit is a receptacle that does not penetrate completely through an entire wall of the wastewater leaching conduit.

18. The wastewater leaching system of claim 17 wherein the wastewater leaching conduit is corrugated pipe or wherein the wastewater leaching conduit and one or more AOSs of the plurality of AOSs are positioned within corrugated pipe.

19. The wastewater leaching system of claim 17 wherein the wastewater leaching conduit and one or more AOSs of the plurality of AOSs are positioned atop, below, or within a wastewater infiltration device.

20. The wastewater leaching system of claim 17 wherein a pressure source is coupled to the wastewater leaching conduit, the pressure source serving to pressurize wastewater in the wastewater leaching conduit or wastewater moving towards the wastewater leaching conduit.

21. The wastewater leaching system of claim 17 wherein one or more of the AOSs of the plurality of AOSs comprises:

a wastewater shield connected to the wastewater leaching conduit seat, the wastewater shield having a wastewater receiving surface,
the wastewater receiving surface positioned apart from an outer surface of the wastewater leaching conduit positioned in the wastewater leaching conduit seat,
the wastewater receiving surface being planar or substantially planar.

22. The wastewater leaching system of claim 17 wherein the wastewater leaching conduit seat, of one or more of the AOSs of the plurality of AOSs, is configured with a receiving area to accept an outer surface of the wastewater leaching conduit.

23. The wastewater leaching system of claim 17 wherein one or more of the AOSs of the plurality of AOSs comprises: a visual indicator that serves to indicate wastewater discharge orifice positioning.

24. The wastewater leaching system of claim 17 wherein the redirected wastewater had previously dripped out of one or more of the wastewater discharge orifices of the wastewater leaching conduit.

* * * * *